Feb. 11, 1969

S. R. MADER ET AL 3,427,154

AMORPHOUS ALLOYS AND PROCESS THEREFOR

Filed Sept. 11, 1964

| FIG. 1A | FIG. 1B |

FIG. 1

Feb. 11, 1969 S. R. MADER ET AL 3,427,154
AMORPHOUS ALLOYS AND PROCESS THEREFOR
Filed Sept. 11, 1964 Sheet 2 of 7

FIG. 1A

INVENTORS
SIEGFRIED R. MADER
ARTHUR S. NOWICK
HANS WIDMER
BY Bernard N. Wiener
ATTORNEY

3,427,154
AMORPHOUS ALLOYS AND PROCESS THEREFOR
Siegfried R. Mader, Putnam Valley, and Arthur S. Nowick, Scarsdale, N.Y., and Hans Widmer, Maichingen, Germany, assignors to International Business Machines Corporation, New York, N.Y., a corporation of New York
Filed Sept. 11, 1964, Ser. No. 395,718
U.S. Cl. 75—134  27 Claims
Int. Cl. C22c *1/00, 5/00;* H01v *11/12*

ABSTRACT OF THE DISCLOSURE

An alloy material which has an amorphous structure that is metastable to a relatively high temperature, e.g., room temperature of 20° centigrade. Vapors of the components of a multicomponent alloy system, e.g., binary system or ternary system, with particular compositions are quenched on a relatively cold substrate to form the amorphous structure. The multi-component alloy system has particular size factors of the components, insolubility range, and average melting temperature.

Since the alloy material is non-equilibrium, it transforms into an equilibrium or near equilibrium structure when sufficient thermal energy is imparted through heating. Because the material has a significant degree of metastability, the transformation requires a relatively large amount of thermal activation. Illustratively, the following alloys have been prepared with amorphous structure where percentages are atomic percent: Cu+Ag in the range of compositions from Cu+35% Ag to Cu+65% Ag; Cu+Mg in the range of compositions from Cu+20% Mg to Cu+90% Mg; Au+Mg as Au+75% Mg; and Co+Ag as Co+17% Ag and Co+50% Ag.

---

This invention relates generally to alloy materials with an amorphous structure; and it relates more particularly to alloy materials with an amorphous structure which are metastable to relatively high temperature, and to materials derivable therefrom.

An alloy is a mixture which has a metallic component. This invention provides an alloy with amorphous structure which is metastable at room temperature and has especial utility in thin film form for computer elements and control circuits. The components of the alloy are incorporated in a homogeneous mixture with transformation tendencies toward diffusion and segregation which are insufficient to overcome the binding forces which maintain the amorphous structure. It is obtained by "vapor quenching" its components on a cold substrate from the vapor state, which does not have the miscibility restrictions of the liquid and solid states.

The physical nature of a material is usually characterized in terms of whether it appears to be solid, liquid or gas. When materials are viewed in terms of physical properties, the lines of demarcation for the liquid, solid and gas states are sometimes blurred. The amorphous alloy provided by the practice of this invention appears to be liquid when studied from electron and X-ray diffraction patterns; the alloy appears to be solid when studied in terms of hardness and viscosity.

The equilibrium state of an alloy at a given temperature is that state at which the thermodynamic free energy, i.e., the energy available to do external work, of the components is a minimum. An amorphous alloy structure is inherently metastable, i.e., the state is non-equilibrium. Since the atoms of an amorphous structure are not arranged in a periodic array, there is at any temperature a tendency of the amorphous structure to transform toward the crystalline structure of the equilibrium state through diffusion or segregation of the components of the alloy. The degree of metastability of the alloy is a measure of how long the amorphous structure will continue to exist at a given temperature before a significant change of state occurs in the direction of the equilibrium state of the alloy at that temperature.

Physical parameters such as resistivity, thermal conductivity, thermal coefficient of expansion and hardness are related to the structure of an alloy. Generally, these properties are different for an amorphous material than for the comparable crystalline material of the same components, e.g., the resistivity is always higher for the amorphous structure and the thermal conductivity is usually lower. Further, an amorphous material usually has different chemical reactivity, magnetic, superconducting and mechanical properties than the comparable crystalline material, i.e., a crystalline material having the same compositions of components. When a single phase crystalline structure does not form at the same compositions, the mixture of the equilibrium crystalline phases is considered for comparison.

An amorphous alloy material obtained by the practice of this invention shows a diffraction pattern with broad halos that are not easily assigned to a crystalline structure. In diffraction patterns there may be a continuous transition from a fine grained crystalline structure with line broadening to a state where the individual lines overlap to such an extent that the result is an amorphous pattern. The dividing line depends on the structure and on the wavelength of the diffracted radiation. For diffraction patterns obtained by electrons of 80 kv. to 100 kv., the dividing line corresponds for typical examples to a particle size of two to three lattice constants. These particles do not meet the definition of a crystal as having a unit cell and a large number of translations of the cell. Another justification for considering the amorphous state to be distinctly different from the fine grained polycrystalline state is indicated by especial properties of the amorphous alloy materials of this invention, e.g., their high degree of metastability. Fine grained crystalline films undergo a continuous grain growth upon warming up, whereas the amorphous alloy materials of this invention transform into a crystalline material in a distinct annealing step.

There have been developments of interest in the prior art of which the following articles are illustrative: Z. Physik, 138, 136 (1954); Nature, 187, 1869 (1960); Z. Physik, 157, 65 (1959); J. Appl. Phys., 33, 1355, (1962).

Amorphous alloys with metastability to relatively high temperatures, e.g., room temperature of 20° centigrade, with the degree of controllability and reproducibility provided by this invention have not been produced before. The prior art has not demonstrated the requisite criteria provided by this invention for the formation of these alloys. The criteria of this invention involve the sizes of the components, the insolubility range in the equilibrium state at the temperature at which particular components have maximum miscibility, and the average melting temperature of the components. The sizes of the components and the insolubility range of the multicomponent alloy system to which they belong determine whether the amorphous structure will occur when the components are deposited from vapor onto a cold substrate. The degree of metastability of the amorphous structure is determined by the average melting temperature of the components. As the average melting temperature increases, the higher is the temperature at which the amorphous structure is retained for practical periods of time, i.e., the greater the degree of metastability.

It is an object of this invention to provide a material with amorphous structure.

It is another object of this invention to provide an alloy material with amorphous structure which is metastable for practical time periods at relatively high temperature.

It is another object of this invention to provide an alloy with amorphous structure obtained by vapor quenching of its components which does not decompose for practical time periods at relatively high temperature.

It is another object of this invention to provide an amorphous alloy material which does not decompose for practical time periods at relatively high temperature obtained by vapor quenching the plurality of components of the system belonging to a multicomponent alloy system having particular size factors, insolubility range and average melting temperature.

It is another object of this invention to provide an amorphous ferromagnetic alloy material by vapor quenching of a plurality of components.

It is another object of this invention to provide an amorphous superconducting material by vapor quenching of a plurality of components.

It is another object of this invention to provide additional useful materials derived from the amorphous material obtained by the practice of this invention.

It is another object of this invention to provide a multiply connected material obtained by leaching an amorphous material obtained by the practice of this invention.

It is another object of this invention to provide a crystalline superconductive alloy material derived by partial annealing of an amorphous alloy material obtained by the practice of this invention.

The foregoing and other objects, features and advantages of the invention will be apparent from the following more particular description of preferred embodiments of the invention as illustrated in the accompanying drawings.

In the drawings.

FIGURGE 5 is an exemplary resistivity vs. annealing temperature curve for an amorphous Ag+Cu film.

The invention provides an alloy material with amorphous structure which is metastable from the temperature of quenching to a relatively high temperature obtained by vapor quenching a plurality of components belonging to a multicomponent alloy system. The multicomponent alloy system has particular size factors of the components, insolubility range, and average melting temperature. The components in the vapor have particular compositions. Since the material is non-equilibrium, it transforms into an equilibrium or near equilibrium structure when sufficient thermal energy is imparted through heating. Because the material has a significant degree of metastability, it requires a relatively large amount of thermal activation for the transformation.

During vapor quenching of components of a multicomponent alloy system from vapor on a cold substrate in the practice of this invention, the nature of the substrate may influence the occurrence of the amorphous structure. The substrate should be one that exerts minimum chemical and mechanical influence on the deposited material. Substrates which have proven to be especially suitable for obtaining the amorphous structure are layers of silicon-oxide and collodion on a good heat conductor such as a sapphire plate.

Several alloys with amorphous structure with metastability to relatively high temperature have been prepared in accordance with the criteria of this invention. It has been demonstrated that the binary alloy systems Co+Cu and Cu+Au do not have an amorphous structure because they do not meet the criteria of this invention. However, materials of the binary alloy systems Cu+Ag, Cu+Mg, Au+Mg, and Ag+Co have been prepared in accordance with the criteria of this invention and do have the expected amorphous structure. Illustratively, the following alloys have been shown to be amorphous where the percentages are atomic percent: Cu+Ag in the range of compositions from Cu+35% to Cu+65% Ag; Cu+Mg in the range of compositions from Cu+20% Mg to Cu+90% Mg; Au+Mg as Au+75% Mg; and Co+Ag as Co+17% Ag and Co+50% Ag.

The criteria for selection of components should desirably be: size factors in the range 10% to 25%; insolubility range within 75% to 100%; and average melting temperature greater than 750° centigrade. The nature of these criteria and the manner in which they are determined for specific cases will now be described.

One criterion of an amorphous alloy obtained by the practice of this invention relates to particular size factors of the multicomponent alloy system to which the components of the alloy belong. There should be sufficient difference between the component radii to inhibit transformation by diffusion or segregation. For component atoms A and B with radii $r_A$ and $r_B$, the size factor is defined as:

$$\frac{|r_B - r_A| \times 100}{1/2(r_B + r_A)} \%$$

In the practice of this invention for an alloy having two component atoms, the size factor is desirably in the range 10% to 25%, the insolubility range is desirably within 75% and 100%, and the average melting temperature is desirably greater than 750° centigrade. Ilustratively, if the size factor for components A and B is 15%, the composition of the amorphous structure may be varied from about A+35% B to A+65% B. As the size factor of the atomic radii increases, the range of compositions over which the amorphous structure occurs increases, e.g., for an atomic radii size factor of 25%, the composition range of the amorphous structure is about A+20% B to A+80% B.

The maximum temperature of the substrate in order to obtain the amorphous structure also increases with increasing size factor. Whereas the substrate temperature should desirably not be higher than −150° centigrade for an Ag+Cu alloy which has a size factor of 12%, it may be as high as room temperature for an Cu+Mg alloy with a size factor of 22%.

Another criterion of an amorphous alloy obtained by the practice of this invention is a significant "insolubility range" of the multicomponent alloy system to which the components of the amorphous alloy belong. There is the equilibrium phase diagram for the components a significant composition range between two terminal solid solutions, i.e., the "insolubility range." Illustratively, for a binary amorphous alloy, the insolubility range is desirably within 75% to 100% between the terminal solubilities. By terminal solid solubility is meant the maximum amount of the second component which can be incorporated into the crystal structure of the pure first component at a given temperature. The "insolubility range" is based on the maximum equilibrium terminal solubilities at elevated temperatures. This criterion is generally related to the size factor criterion. However, it must be taken in consideration as an additional factor since there are some binary alloy systems which meet the first criterion but do not meet the second criterion. These two criteria together determine the occurrence of the amorphous structure upon deposition of the components from vapor on a substrate through vapor quenching.

The average melting temperature of the components criterion of an amorphous alloy obtained by the practice of this invention determines to what elevated temperature it will remain metastable. In order that a two component alloy with metastable amorphous structure prepared by the practice of this invention remain metastable to room temperature or higher, the components should desirably have an average melting temperature greater than 750° centigrade. The basis for this criterion is that the crystallization temperature $T_x$ at which the amorphous structure decomposes to crystalline is found to be about 0.3 of the melting temperature $T_m$ on the Kelvin scale. The temperature $T_x$ is determined by the appropriate energy of activation. When the driving force for decomposition of the amorphous structure toward the corresponding equilibrium crystalline structure is greater than about 5 Kcal./mole, the average melting temperature is usually higher, i.e., the ratio $T_x/T_m$, defined herein as the "reduced crystallization temperature," is smaller than 0.3. The effect of the driving force may be described with reference to the theory of absolute reaction rates. A background reference on the theory of reaction rates is The Theory of Reaction Rates by S. Glasstone et al., McGraw-Hill Book Co., Inc., 1941. According to the theory of reaction rates, any small assemblage of atoms, at any finite temperature, has a finite probability of acquiring the necessary activation energy for a particular transformation from one state to another state. The higher the activation energy, the lower is this probability. It may be shown that the larger the driving force, the less the energy of activation that is required to effect the transformation from the initial state to the final state over the potential barrier.

The selection of components for the practice of this invention to obtain an amorphous alloy desirably involves, for atomic components, a table of atomic radii and phase diagrams. An illustrative table of atomic radii suitable for this purpose is presented in the text Physical Chemistry of Metals by L. S. Darken et al., McGraw-Hill Book Co., 1953, pages 50 to 57. The table provides a list of the accepted values for the atomic radii and permits a determination of appropriate size factors for selection of the components for an alloy obtainable by the practice of this invention. As molecular size is based on the sizes of the constituent atoms or ions of a molecule, molecules may be used satisfactorily in the practice of this invention provided the resultant material is an alloy, i.e., it includes a metallic component.

A phase diagram characterizes the proportions of phases in equilibrium at various temperatures and compositions. The text Constitution of Binary Alloys by M. Hansen et al., McGraw-Hill, Inc., 1958, is illustrative of background material on binary phase diagrams.

The criteria of this invention are applicable for obtaining an amorphous alloy from a ternary alloy system as well as from a higher order system. For the practice of this invention as applied to a ternary alloy, there is a size factor for each pair of components. The size factor should desirably be greater than 10% for at least one of the pairs. The insolubility range should desirably be at least 75% in the ternary phase diagram for at least one pair of components, or for a quasi-binary combination consisting of one component with a compound of the other two components. Several ternary phase diagrams are given in the text Metals Reference Book, vol. 1, by C. J. Smithells, Butterworth, Inc., 1962. Further, a background text is Ternary Systems by G. Masing, Dover Publications, Inc., 1944.

Vapor quenching techniques

It is necessary to obtain a vapor having particular compositions of suitable components in order to utilize vapor quenching for obtaining an amorphous alloy according to this invention. The vapor quenching may be achieved by several techniques. One technique is to be described hereinafter in considerable detail with reference to FIGURES 1A, 1B and 1C which use a separate source for each component in a modification of the technique described by M. Beckerman et al., 1961 Transactions of the 8th Vacuum Symposium and 2nd International Congress, Pergamon Press, New York 1962, page 905.

Flash evaporation may also be carried out from a single source such as described by E. K. Muller et al., J. Appl. Phys., 35, 1233, (1964). Normal evaporation may be carried out from a single source provided that the source alloy composition is adjusted to compensate for the difference in vapor pressures of the components. Evaporation may also be carried out by electron bombardment rather than direct resistance heating of a component source. An entirely different approach for obtaining the vapor is through the use of sputtering which may be used with single or multiple sources.

The nature of exemplary apparatus for the preparation of the materials of this invention will be described with reference to FIGURES 1A, 1B and 1C. Briefly, sources 22 and 24 containing illustrative components A and B, respectively, are heated to obtain vapors of the components. The heating of the sources and monitoring of the rates are controlled by circuitry 11.

Apparatus 10 has a vacuum chamber 12 within housing 14. Housing 14 has envelope 16 and base 18. A vacuum is maintained in chamber 12 by evacuating it via orifice 20 by a conventional vacuum device, not shown. Since the apparatus 10 has two systems 11 and 11' for evaporation and control of components A and B, respectively, which are identical in nature and operation, their structure will be described with reference to FIG. 1B which is shown connected to the elements used with respect to component A. Components A and B are retained by containers 22 and 24, respectively, which are heated electrically via lines 26 from power supply 30 under control of relay 62. Power supply 30 is connected to source 22 to vaporize source material A. Ionization gauges 50 and 52 are placed in vapor pressure sensing condition with respect to sources 22 and 24, respectively. Gauge 32 is connected via line 36 to ionization gauge control 38.

Placed immediately above component sources 22 and 24 are metallic grids 40 and 42, respectively, which serve as suppression screens for charged particles. The detailed nature of such screens and circuits therefor are described in IBM Technical Disclosure Bulletin, vol. 6, No. 7, December 1963, page 77, in an article entitled "Suppression Screen for Evaporation Rate Control" by H. Widmer et al. Suppression screen 42 is connected via line 44 to suppression screen control 46 which is connected via line 48 to source 22. Ionization gauges 50 and 52 are at an angular position with respect to the coaxial line of sources 22 and 24 so as to sense only components A and B, respectively. Shield 53 is placed between sources 22 and 24 to preclude the component in source 22 from reaching ionization gauge 52 and the component in source 24 from reaching ionization gauge 50. The null detector 60 responds to the difference between required rate set in vapor rate setter 66 added to the rate detected by ionization gauge 32 provided by rate adder unit 72 and the rate detected by ionization gauge 50. Consequently, the temperature of source 22 is raised by power supply 30 when necessary to keep these two parameters equal.

Figure 1:
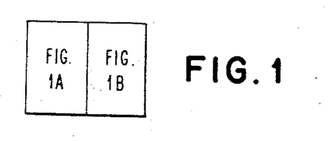
FIGURE 1 is an organizational diagram of FIGURES 1A and 1B.
Figure 1A:
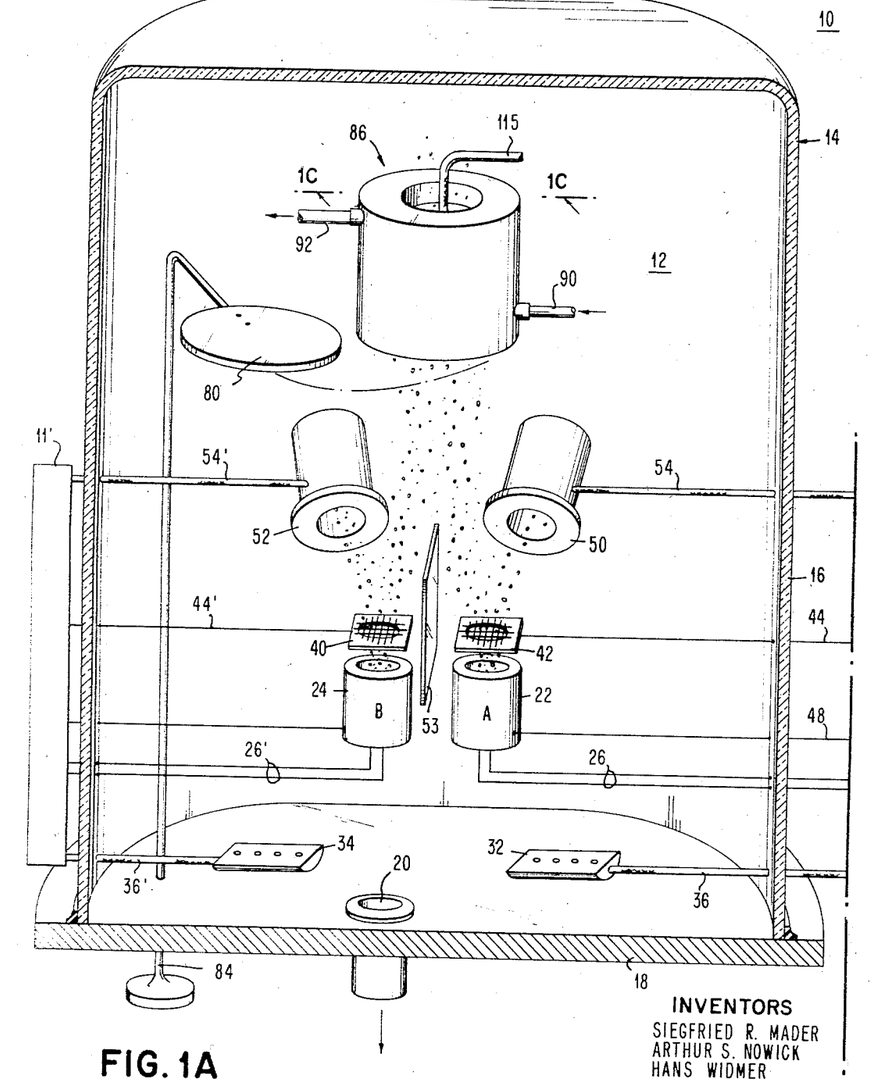
FIGURES 1A, 1B and 1C are perspective views, partly cut away, of apparatus for deposition of two components on a cold substrate.
Figure 1B:
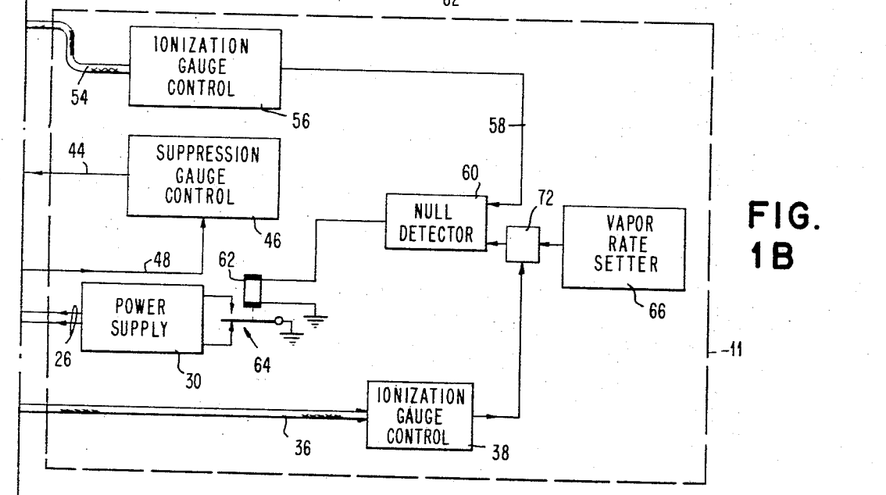
Figure 1C:
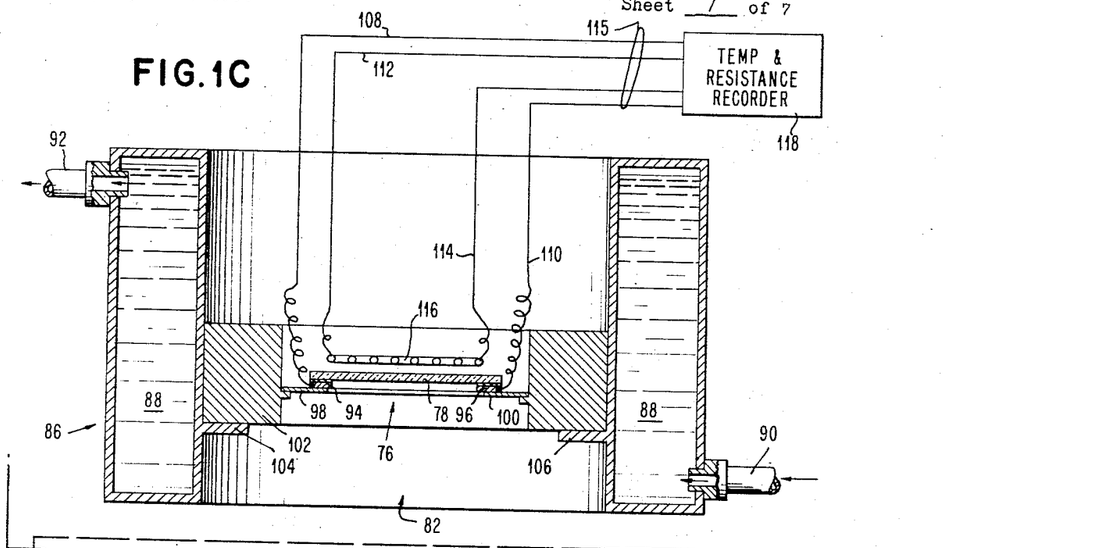

The deposition of structures in accordance with this invention is obtained on surface 76 of sapphire plate 78 (FIGURE 1C). Blocking plate 80 is moved across opening 82 by rotating arm 84 when it is desired to preclude components A and B from substrate 78. Housing 86 has chamber 88 within which liquid nitrogen is entered via orifice 90 and exited via orifice 92.

The detailed nature of the apparatus 10 for deposition of the materials of this invention will be described with reference to FIGURE 1C. Substrate 78 is supported by metal wafers 94 and 96 placed on insulator projection arms 98 and 100, respectively. Insulator projection arms 98 and 100 are connected to bracket 102 which is supported by housing 86 on ledges 104 and 106, respectively. For testing the resistivity vs. temperature of the specimen prepared through the operation of the apparatus 10, there is provided electrical contact wires 108 and 110 and heater wires 112 and 114 connected to heater 116. The heater wires and resistance measuring wires are connected to temperature and resistance recorder 118. The temperature measurement is made by placing a thermocouple, not shown, proximate the substrate 78 and recording the temperature by recorder 118. Wires 108, 110, 112 and 114 comprise cable 115 connected to recorder 118.

Simulation experiment

The following description of simulation experiments will assist in the visualization of the metastable amorphous structure of materials provided by this invention. The simulation experiments clearly demonstrate that a pattern of hard spheres of properly different sizes is established as a metastable amorphous structure when the spheres are deposited at random. Generally, if the size difference is greater, the range of composition over which the amorphous structure forms is greater. Although the spheres are not replicas of atomic and molecular components, there is extremely good comparison between the simulation results and the experiments with alloys based on criteria provided by this invention.

The simulation experiment mainly shows the geometrical aspect, i.e., the effect of the sizes of the spheres. Thus, the simulation experiments provide an insight into the role of the size factors provided for the practice of this invention with atomic and molecular components in an alloy with amorphous structure. Further, the simulation experiment shows the difference between an amorphous structure and a crystalline structure.

Figure 2A:
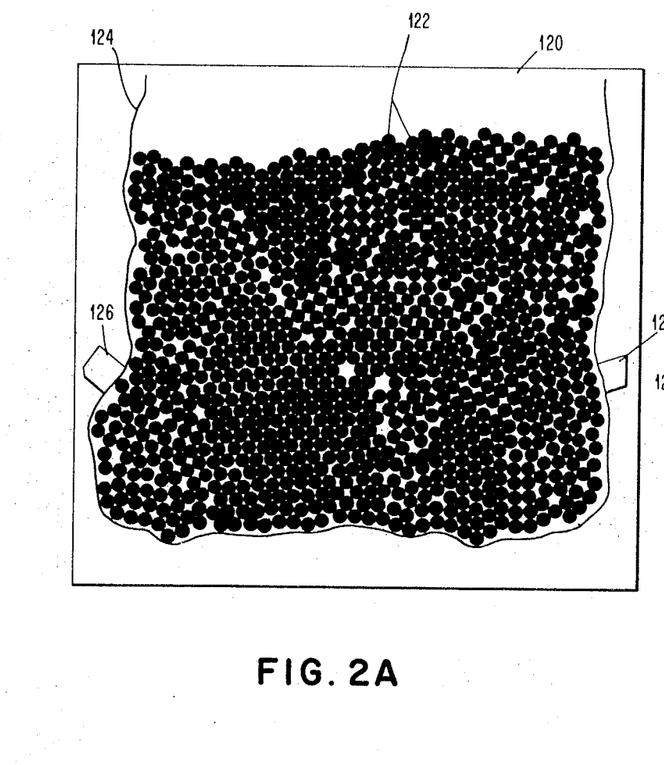
FIGURES 2A and 2B are illustrative of the results of a simulation experiment with hard plastic spheres of one size established at random on a flat plate shown before and after annealing by mechanical vibration.
Figure 2B:
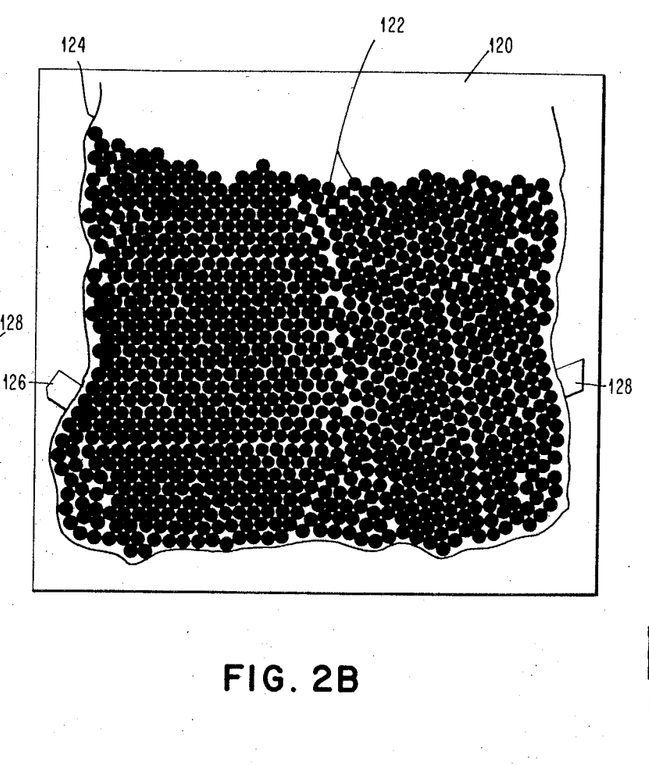
Figure 3A:
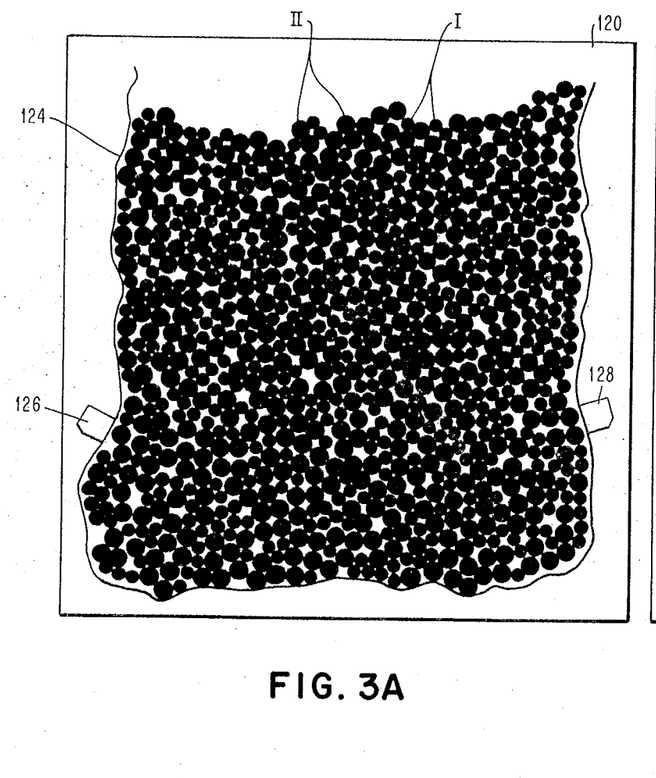
FIGURES 3A and 3B are illustrative of the results of a simulation experiment with hard plastic spheres with a 22% size difference established at random on a flat plate shown before and after annealing by mechanical vibration.
Figure 3B:
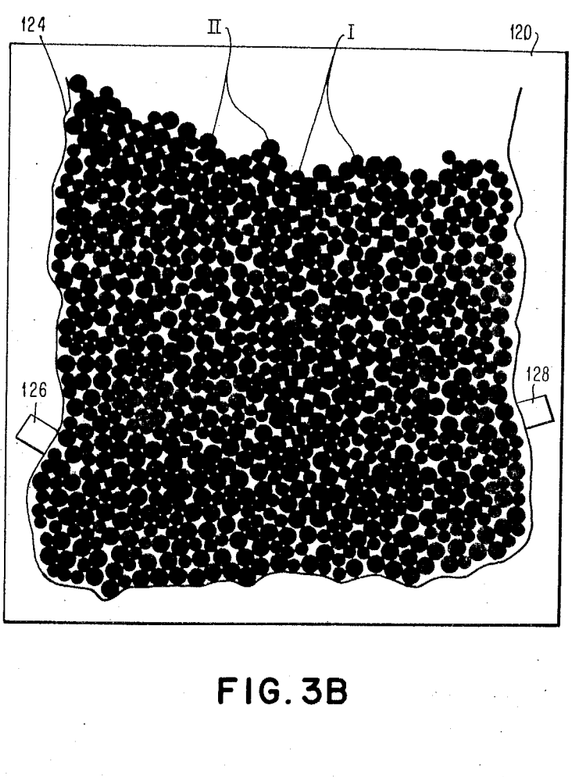

Hard plastic spheres 120 of one size (FIG. 2A) are deposited with random incidence by rolling into a slightly inclined plate 122 within a space determined by rim 124. The rim is secured to plate 122 by brackets 126 and 128. There are large areas in which the balls deposit themselves in regular patterns which simulate a "crystal" structure. There are some interfaces and areas of random distribution, but it is clear that "crystal" structure has appeared. In FIG. 2B, the transformation of the pattern of FIG. 2A is shown after the container was vibrated significantly to simulate thermal agitation. It is apparent that the "crystal" structures have grown although there remains random disposition of some spheres. It is of interest to note that there are various demarcations among the "crystal" areas which have analogs in an actual crystalline solid, e.g., twin boundaries and grain boundaries. In FIG. 3, there is shown the result of experiments with spheres I and II having 22% size difference with 50% of size I spheres and 50% of size II spheres. The deposited structure of FIG. 3A is clearly amorphous in that no "crystalline" regions can be identified. Regularity is not apparent on a long range basis. Although there is some regularity on a short range basis, a random deposition is obtained over a few spheres of size I or size II. In FIG. 3B, the spheres I and II of FIG. 3A are shown after mechanical vibration. There is an indication that some of the spheres have changed location. However, it is as if the components were mainly pinned in place and the basic structure remained even after vibration.

Exemplary experiment

Figure 4:
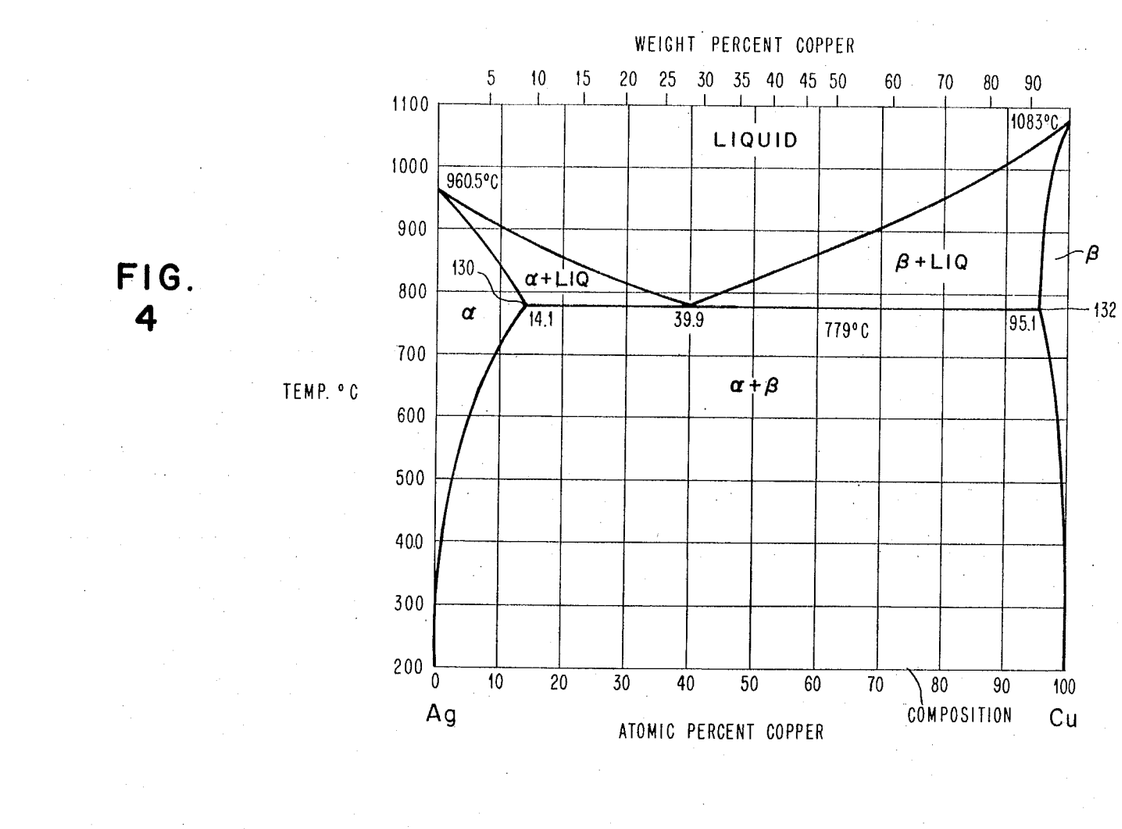
FIGURE 4 is an exemplary equilibrium phase diagram for the two components Ag and Cu.
Figure 5:
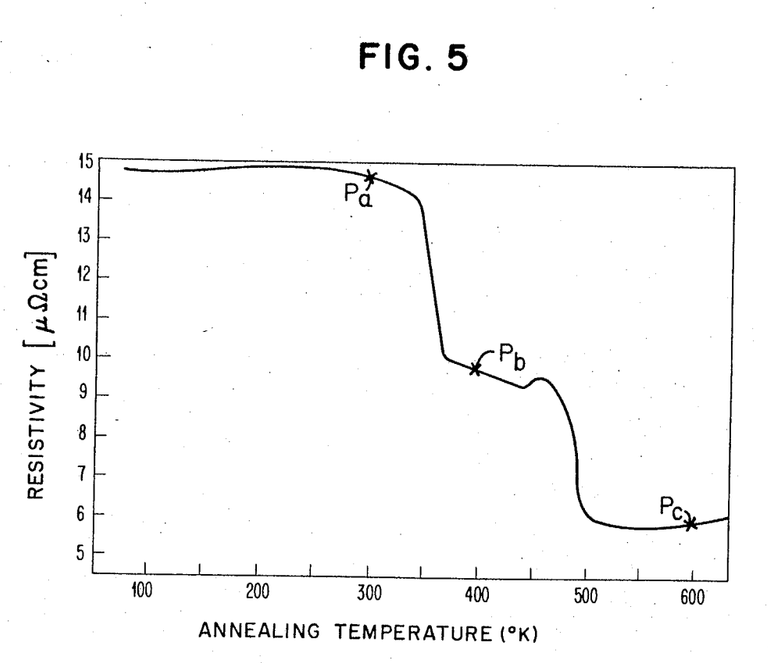
Figure 6:
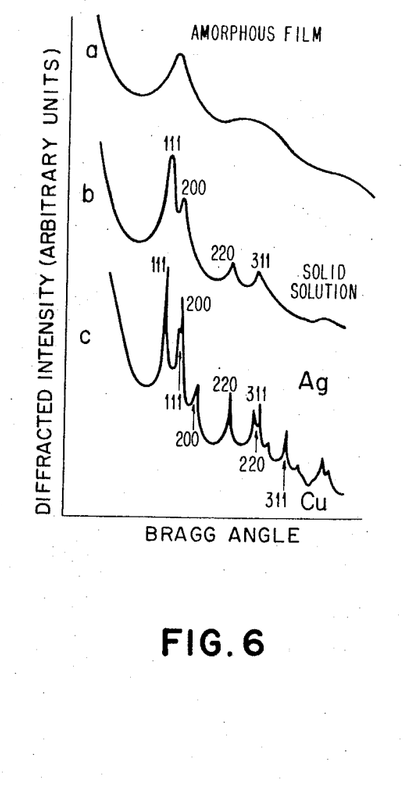
FIGURE 6 is a diffracted intensity vs. Bragg angle diffraction pattern for an exemplary Ag+Cu alloy at amorphous film; and as crystalline solid solution and two phase crystalline structure derived by annealing of the amorphous film.

An experiment with Cu+Ag alloys for the practice of this invention will now be described with reference to the equilibrium phase diagram of FIG. 4, the resistivity vs. temperature curve of FIG. 5, and the diffracted intensity vs. Bragg angle curves of FIG. 6. Generally, experimental results for other multicomponent alloy systems are analogous.

The equilibrium phase diagram for Cu+Ag alloys (FIG. 4) shows a simple eutectic with negligible solubility below 200° centigrade. For Cu+Ag alloys in the composition range 35 to 65 at. percent Ag deposited on substrate 76 at 80° Kelvin, an amorphous-type diffraction pattern $a$ of FIG. 6 was obtained after annealing the film to room temperature. For comparison, $b$ and $c$ are the diffracted intensity vs. Bragg angle curves after 400° Kelvin anneal (crystalline solid solution) and after 600° Kelvin anneal (crystalline Ag and Cu), respectively.

The exemplary experiment obtained an alloy with amorphous structure with metastability to room temperature. The size factor for the Ag+Cu system is greater than 10% which is a criterion of this invention. The atomic radius of Ag is 1.44 angstrom units while that of Cu is 1.28 angstrom units giving a size factor of 11.8%. The insolubility range is 81% which is within the criterion range for the invention of 75% to 100%. The phase diagram of this system is illustrated in FIG. 4 in which $\alpha$ and $\beta$ designate the Ag-rich and Cu-rich terminal solid solutions, respectively. It is clear from the maximum solubilities (14.1 at. percent at the Ag-rich end, indicated as point 130, and 4.9 at the Cu-rich end, indicated as point 132) that the insolubility range is 81%. The average melting temperature is 960° centigrade, which is above the lower boundary on average melting temperature of 750° centigrade, a criterion of this invention to obtain metastability of the amorphous structure to room temperature. The resistivity vs. temperature curve (FIG. 5) shows a distinct first step which is indicative of the change from an amorphous structure toward a crystalline structure.

Apparatus 10 of FIG. 1 was used for the simultaneous evaporation of the two metals Cu and Ag at $10^{-7}$ and $10^{-8}$ torr pressure with rate monitor circuits 11 and 11' which allow independent control of the evaporation rates of the two components. The alloy composition was predetermined to within 2%. The thickness of all the alloy films was from 600 angstrom units to 1000 angstrom units. Substrate 76 was a collodion or silicon-oxide layer on a sapphire plate which was maintained at 80° Kelvin during evaporation. The films were warmed to room temperature and removed from the vacuum system for structural examination of the films in the electron microscope. Resistivity and temperature measurements (FIG. 5) were made of the film in the apparatus 10 (FIG. 1) so that the extent of annealing during warmup to room temperature could be ascertained. The points $P_a$, $P_b$ and $P_c$ correspond to the diffraction curves $a$, $b$ and $c$ of FIG. 6, respectively.

The resistivity vs. temperature measurements (FIG. 5) made on such films during the warmup show a small and gradual anneal between 80° Kelvin and room temperature. When the film was warmed above room temperature, two distinct annealing steps were observed. For a film of Cu+50% Ag, the first and sharper step I (FIG. 5) is near 100° centigrade (370° Kelvin). The diffraction pattern $b$ shown in FIG. 6 is that of a film of Cu+50% Ag taken through this annealing step to a state represented by point $P_b$ of FIG. 5 where it is a single-phase crystalline solid solution, ie., metastable crystalline alloy material obtained by partial annealing of the amorphous alloy. Upon further heating, the second annealing step occurred near 200° centigrade (470° Kelvin). A film taken to point $P_c$ of FIG. 5 gave the pattern "c" of FIG. 6 which represents two face centered cubic structures whose lattice parameters correspond closely to those of Ag and Cu.

Summary of experimental data

Figure 7:
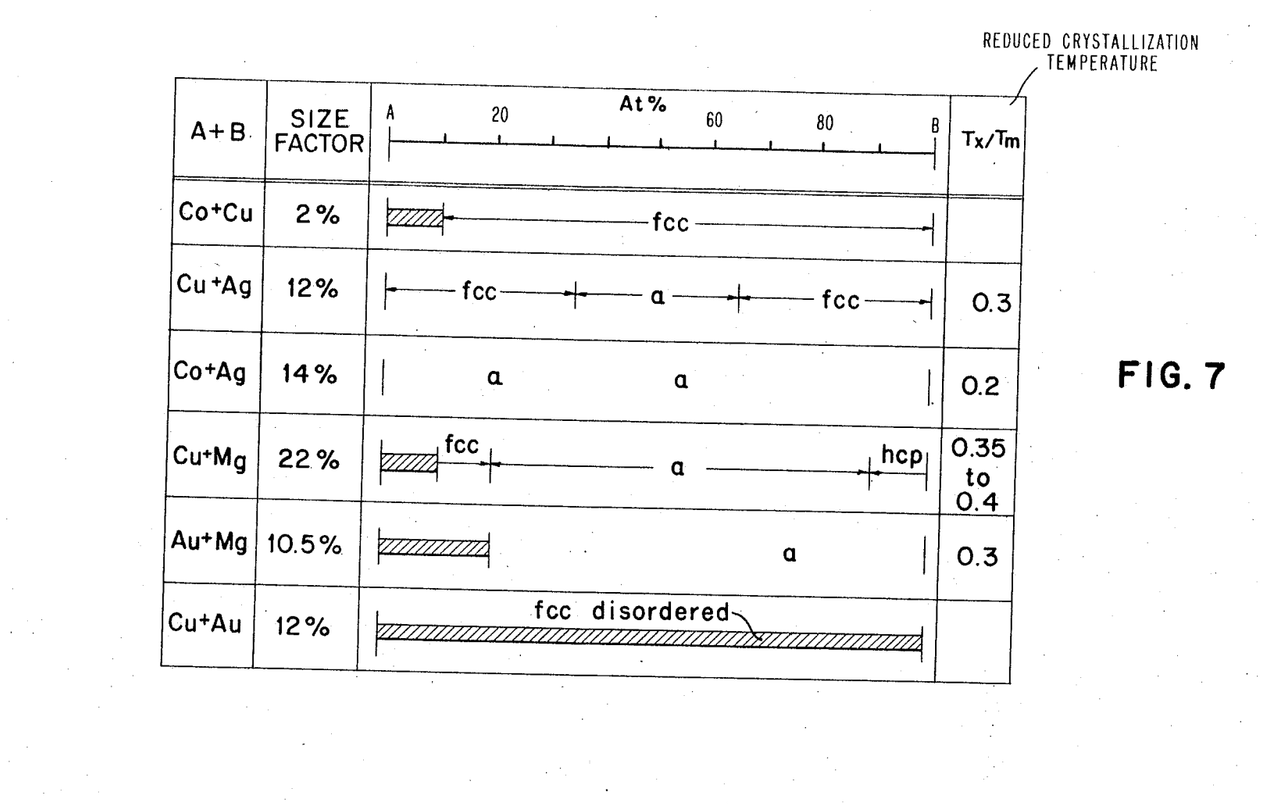
FIGURE 7 is a table which summarizes experimental data on several amorphous alloy materials having metastability to relatively high temperature.

FIG. 7 is a table of data on several binary alloy systems. The binary alloy systems Co+Cu and Cu+Au do not have an amorphous structure since the criteria of the invention are not met. The binary alloy systems Cu+Ag, Co+Ag, Cu+Mg and Au+Mg do have the amorphous structure since they do meet the criteria of the invention. While one or two of the criteria may be present for a binary alloy system, each criterion, i.e., size factor, insolubility range and average melting temperature, must be present for there to occur an amorphous structure which is metastable to room temperature.

The first column of the table of FIG. 7 indicates the alloy system $A+B$. The second column indicates the size factor. Concentration is plotted in the third column from 100% A to 100% B where the hatched region shows terminal solid solubility in the equilibrium phase diagram. The regions adjoining terminal solubilities are indicated as the structures (face centered cubic (FCC), body centered cubic (BCC), hexagonal close packed (HCP), or amorphous $a$) as they are formed in various concentration regions by vapor quenching the two components A and B at 80° Kelvin. Arrows indicate concentration regions that have been explored with several alloy compositions, and isolated letters designate results for a particular composition. The fourth column of the table of FIG. 7 lists the reduced crystallization temperature $T_x/T_m$ which is a measure for the stability of the amorphous films, namely, the ratio of the crystallization temperature $T_x$ at which a film transforms into a crystalline structure and the average melting temperature $T_m$ of the components. The Co+Cu system has too small a size factor and does not have an amorphous structure even though it meets the insolubility range criterion of the invention. Since the Cu+Au system does not have an insolubility range, it does not meet the requirements of the present invention in spite of its large size factor.

The temperature of the substrate has a strong influence on the composition range within which the amorphous structure exists. The critical size factor is larger with increasing substrate temperature. Illustratively, deposition of Cu+Ag at room temperature obtains a crystalline structure, whereas the room temperature deposition of Cu+Mg provides an amorphous structure as after 80° Kelvin deposition.

Alloys with approximately the critical size factor have reduced temperatures of crystallization $T_x/T_m$ of about 0.3 which increases with the increase in size factor. This increasing metastability of the amorphous structure with increasing size factor was also substantiated by microscopic metallurgical examination.

The Co+Ag system alloys have a reduced temperature of crystallization $T_x/T_m$ value of 0.2. A study of equilibrium phase diagrams for these alloys indicates that there is a large driving force out of the homogeneously mixed amorphous state. The miscibility gap in the liquid indicates a strong repulsion between Co and Ag atoms which may reduce the activation energy that is necessary for the transformaiton of the amorphous structure to the crystalline structure.

Magnetic materials

It has been demonstrated for the practice of this invention that it is possible to obtain ferromagnetism in the amorphous state for the alloys of the Co+Ag system. The structure sensitive ferromagnetic properties, e.g., the remanence and coercive force of an amorphous material are different from those of the corresponding crystalline material. This is due to such factors as the absence of magneto-crystalline anisotropy for amorphous materials, and to the different types of domain srtuctures for such materials. The facility for domain boundary motion in the amorphous structure due to absence of crystal boundaries and inhomogeneities leads to low coercivity and high permeability which are desirable properties for thin film magnetic materials for computer memories. Exemplary ferromagnetic amorphous structures Co+17% Ag and Co+50% Ag alloys prepared by the practice of the invention had rectangular hysteresis-loop and microscopic ferromagnetic isotropy at 20° centigrade.

Superconductors

It is known that imperfections in crystals lead to an increase in the critical temperature $T_c$ for superconductivity as well as to increase in the critical field. It has been shown in the prior art that amorphous Sn+10% Cu has a much high $T_c$ than the same alloy in crystalline form, and that the amorphous Bi is superconducting although the crystalline form is not. Through the practice of this invention, combinations such as Nb+Sn and Nb+Zr, which are high field superconductors with high $T_c$ in the crystalline form, may be made in amorphous form. Further, metals which do not mix may be combined through the practice of this invention to make amorphous alloys with favorable electron/atom ratios for high $T_c$. B. T. Matthias in the article on page 138 of the book Progress in Low Temperature Physics, vol. II, North Holland Pub. Co., Amsterdam, 1957, discusses the relationship of electron/atom ratios to the critical temperature $T_c$.

Other uses of amorphous materials of invention

The amorphous materials provided by this invention may be used for the development of particular values of structure sensitive properties upon partial thermal annealing. Illustratively, a wire range of coercivities is obtained upon decomposition of a homogeneous amorphous Co+Ag system film, dependent on the size of the equilibrium phase particles which are obtained in a particular annealing treatment.

The different chemical reactivity of amorphous material than the crystalline material of the same composition, i.e., equilibrium or metastable states, permits obtaining by the practice of this invention a wide range of materials with especial structure properties. Illustratively, a 0.1% hydrochloric acid solution leaches Cu easily out of amorphous Cu+Ag films leaving a silver film of spongy consistency, i.e., a "multiple connected" structure. Materials of this type which are multiple connected on a microscopic scale are desirable for superconducting devices as well as other uses.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An alloy material with amorphous structure which is metastable to relatively high temperature, said alloy belonging to a multicomponent alloy system with particular size factor in the range of about 10% to 25% and insolubility range about 75% to 100% determining the occurrence of said structure and average melting temperature greater than approximately 750° C. determining the degree of said metastability, said size factor determining the range of composition of said structure, and said components being insoluble in the liquid state.

2. The material of claim 1 in which the number of said components is two and said multicomponent alloy system is a binary alloy system.

3. The material of claim 1 in which the number of said components is three and said multicomponent alloy is a ternary alloy system.

4. The material of claim 1 for which said average melting temperature gives a reduced crystallization temperature in the range of 0.2 to 0.4.

5. A ferromagnetic alloy material with amorphous structure which is metastable to relatively high temperature, said alloy belonging to a multicomponent alloy system with particular size factor in the range of about 10% to 25% and insolubility range about 75% to 100% determining the occurrence of said structure and average melting point greater than approximately 750° C. determining the degree of said metastability, said alloy material having ferromagnetic properties, said size factor determining the range of compositions of said structure, and said components being insoluble in the liquid state.

6. The material of claim 5 which is an alloy of the binary system Co+Ag with composition Co+17% Ag.

7. The material of claim 5 which is an alloy of the binary system Co+Ag with composition Co+50% Ag.

8. The material of claim 5 in which said ferromagnetic magneto-crystalline property of said material is isotropic.

9. The material of claim 5 in which at least one of said components is a ferromagnetic metal.

10. A superconductive alloy material with amorphous structure which is metastable to relatively high temperature, said alloy belonging to a multicomponent alloy system with particular size factor in the range of about 10% to 25% and insolubility range about 75% to 100% determining the occurrence of said structure and average melting temperature greater than approximately 750° C. determining the degree of said metastability, said material being superconductive below a critical temperature, said size factor determining the range of compositions of said structure, and said components being insoluble in the liquid state.

11. The material of claim 10 which is an alloy of the binary system Nb+Zr.

12. The material of claim 10 which is an alloy of the binary system Nb+Sn.

13. The material of claim 10 having higher superconductive critical temperature than a corresponding crystalline material in said multicomponent alloy system.

14. The material of claim 10 in which the equilibrium structure of said multicomponent alloy system is not superconductive.

15. Process for providing an alloy material with amorphous structure which is metastable to relatively high temperature comprising the steps of:
providing the components of a multicomponent alloy system, said components having criteria of size factor and insolubility range determining the occurrence of said structure and having criterion of average melting temperature determining the degree of said metastability, and said criterion of size factor determining the range of compositions of said structure;
vaporizing said components to vapors thereof; and
quenching said vapors on a substrate at a given temperature to form said amorphous structure.

16. Process according to claim 15 wherein said average melting temperature gives a reduced crystallization temperature in the range 0.2 to 0.4.

17. Process according to claim 15 wherein said alloy system is Cu+Ag in the range of compositions from Cu+35% Ag to Cu+65% Ag.

18. Process according to claim 15 wherein said alloy system in Cu+Mg in the range of compositions from Cu+20% Mg to Cu+90% Mg.

19. Process according to claim 15 wherein said alloy system is Au+Mg with composition Au+75% Mg.

20. Process according to claim 15 wherein said alloy system is Co+Ag with composition Co+17% Ag.

21. Process according to claim 15 wherein said alloy system is Co+Ag with composition Co+50% Ag.

22. Process according to claim 15 wherein said average melting temperature of said components gives a reduced crystallization temperature in the range 0.2 to 0.4, and said insolubility range is within 75% to 100%.

23. Process according to claim 15 wherein said size factors are in the range 10% to 25%, said insolubility range is within 75% to 100%, and said average melting temperature is greater than 750° centigrade.

24. Process according to claim 15 including the step of leaching said alloy material to provide a multiple connected material.

25. Process according to claim 15 including the step of partially annealing said alloy material to provide a metastable crystalline material having metastability to relatively high temperature.

26. Process according to claim 25 wherein said metastable crystalline material is superconductive and has a different superconductive critical temperature than the superconductive critical temperature of the corresponding equilibrium structure in said multicomponent alloy system.

27. Process according to claim 25 wherein said metastable crystalline material is ferromagnetic and has different ferromagnetic properties than the ferromagnetic properties of the corresponding equilibrium structure in said multicomponent alloy system.

References Cited

UNITED STATES PATENTS

| | | | |
|---|---|---|---|
| 2,129,702 | 9/1938 | Merle | 22—200.5 |
| 3,297,436 | 1/1967 | Duwez | 75—135 |

RICHARD O. DEAN, *Primary Examiner.*

U.S. Cl. X.R.

75—135, 122; 148—13, 31.55, 133, 32; 117—107, 227